(12) United States Patent
Yamada et al.

(10) Patent No.: US 9,627,999 B2
(45) Date of Patent: Apr. 18, 2017

(54) POWER SUPPLY DEVICE

(71) Applicant: VOLVO TRUCK CORPORATION, Gothenburg (SE)

(72) Inventors: Yoshiaki Yamada, Saitama (JP); Takayuki Tsuchiya, Saitama (JP); Kunihiko Hikiri, Saitama (JP); Koichi Itani, Saitama (JP); Hiroshi Toyama, Saitama (JP); Noriaki Miyake, Saitama (JP)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 14/441,301

(22) PCT Filed: Nov. 7, 2012

(86) PCT No.: PCT/JP2012/078876
§ 371 (c)(1),
(2) Date: May 7, 2015

(87) PCT Pub. No.: WO2014/073058
PCT Pub. Date: May 15, 2014

(65) Prior Publication Data
US 2015/0311831 A1 Oct. 29, 2015

(51) Int. Cl.
*H02P 1/00* (2006.01)
*H02P 4/00* (2006.01)
(Continued)

(52) U.S. Cl.
CPC ............... *H02P 4/00* (2013.01); *B60L 7/16* (2013.01); *B60L 11/005* (2013.01); *B60L 11/14* (2013.01);
(Continued)

(58) Field of Classification Search
CPC ........ H02J 1/06; H02J 1/10; H02J 2007/0039; H02J 3/383; H02J 3/385; H02J 3/386;
(Continued)

(56) References Cited

U.S. PATENT DOCUMENTS 5,710,699 A * 1/1998 King ................... B60L 11/005
318/139
6,424,156 B1 * 7/2002 Okamura ............. B60L 11/005
324/426
(Continued)

FOREIGN PATENT DOCUMENTS

EP 2051358 A1 4/2009
JP 2006087299 A 3/2006
(Continued)

OTHER PUBLICATIONS

Di Napoli, A., et al.; "Multiple-input dc-dc power converter for power-flow management in hybrid vehicles," Conference Record of the 2002 IEEE Industry Applications Conference; 37th IAS Annual Meeting; Oct. 13-18, 2002, Pittsburgh, Pennsylvania, USA; IEEE Service CE; vol. 3m, Oct. 13, 2002 (Oct. 13, 2002), pp. 1578-1585, XP010610090.

*Primary Examiner* — Paul Ip
(74) *Attorney, Agent, or Firm* — Laurence A. Greenberg; Werner H. Stemer; Ralph E. Locher

(57) ABSTRACT

A power supply device for supplying power to a load by combining a secondary battery and a capacitor includes a bypass switch which enables power to be directly supplied to the load from the capacitor by being switched to a connected state when a voltage of the capacitor is a voltage capable of driving the load, and a first DC-DC converter which enables the voltage of the capacitor to be stepped up and supplied to the load when the voltage of the capacitor drops below a minimum voltage capable of driving the load.

10 Claims, 6 Drawing Sheets

(51) Int. Cl.
| | |
|---|---|
| *H02J 7/00* | (2006.01) |
| *B60L 11/00* | (2006.01) |
| *B60L 11/14* | (2006.01) |
| *B60L 11/18* | (2006.01) |
| *B60L 7/16* | (2006.01) |
| *H02J 7/34* | (2006.01) |
| *H02P 3/14* | (2006.01) |
| *B60L 15/20* | (2006.01) |
| *H02M 7/5387* | (2007.01) |
| *H02M 1/00* | (2006.01) |
| *H02M 3/156* | (2006.01) |

(52) U.S. Cl.
CPC ....... *B60L 11/1803* (2013.01); *B60L 11/1861* (2013.01); *B60L 11/1868* (2013.01); *B60L 15/2045* (2013.01); *H02J 7/0063* (2013.01); *H02J 7/345* (2013.01); *H02P 3/14* (2013.01); *B60L 2210/10* (2013.01); *B60L 2210/14* (2013.01); *B60L 2210/40* (2013.01); *B60L 2240/547* (2013.01); *H02M 3/156* (2013.01); *H02M 7/5387* (2013.01); *H02M 2001/007* (2013.01); *Y02T 10/70* (2013.01); *Y02T 10/7005* (2013.01); *Y02T 10/7022* (2013.01); *Y02T 10/7044* (2013.01); *Y02T 10/7066* (2013.01); *Y02T 10/7077* (2013.01); *Y02T 10/7225* (2013.01); *Y02T 10/7241* (2013.01)

(58) Field of Classification Search
CPC ...... H02J 7/0024; H02J 7/0054; H02J 7/0065; H02M 3/1582; H02M 1/36; H02M 1/4258; H02M 2001/007; H02M 3/07; H02M 3/155
USPC .......................... 318/139, 148; 307/9.1, 10.1
See application file for complete search history.

(56) References Cited

U.S. PATENT DOCUMENTS

| | | | | | |
|---|---|---|---|---|---|
| 6,801,023 | B2* | 10/2004 | Wu | ........................ | H02J 9/062 323/222 |
| 6,879,502 | B2* | 4/2005 | Yoshida | ................ | H02M 3/156 363/60 |
| 6,906,933 | B2* | 6/2005 | Taimela | .................... | H02J 3/32 363/34 |
| 7,279,855 | B2* | 10/2007 | Tahara | .................... | B60K 6/26 318/46 |
| 7,427,450 | B2* | 9/2008 | Raiser | ................. | B60L 11/1887 320/101 |
| 7,782,032 | B2* | 8/2010 | Taufik | ................. | H02M 3/1584 323/272 |
| 7,977,819 | B2* | 7/2011 | Kitanaka | .................. | B60L 9/22 307/64 |
| 8,008,876 | B2* | 8/2011 | Yonemori | ............. | B60L 11/123 318/139 |
| 8,074,753 | B2* | 12/2011 | Tahara | .................... | B60K 6/26 180/65.21 |
| 8,080,973 | B2* | 12/2011 | King | .................. | B60L 11/1803 320/104 |
| 8,378,623 | B2* | 2/2013 | Kusch | .................. | B60L 11/005 320/104 |
| 9,024,573 | B2* | 5/2015 | King | .................. | B60L 11/1803 320/107 |
| 2004/0085785 | A1* | 5/2004 | Taimela | .................... | H02J 3/32 363/37 |
| 2004/0090806 | A1* | 5/2004 | Yoshida | ................ | H02M 3/156 363/60 |
| 2006/0127704 | A1* | 6/2006 | Raiser | ................. | B60L 11/1887 429/9 |
| 2006/0152180 | A1* | 7/2006 | Tahara | .................... | B60K 6/26 318/139 |
| 2008/0067872 | A1* | 3/2008 | Moth | ....................... | H02J 9/062 307/23 |
| 2008/0315803 | A1* | 12/2008 | Yonemori | ............. | B60L 11/123 318/148 |
| 2009/0039703 | A1* | 2/2009 | Soma | ....................... | B60K 6/28 307/10.1 |
| 2009/0114462 | A1* | 5/2009 | Tahara | .................... | B60K 6/365 180/65.21 |
| 2009/0140706 | A1* | 6/2009 | Taufik | ................. | H02M 3/1584 323/272 |
| 2009/0315401 | A1 | 12/2009 | Yoshida et al. | | |
| 2009/0322148 | A1* | 12/2009 | Kitanaka | .................. | B60L 9/22 307/9.1 |
| 2010/0097031 | A1* | 4/2010 | King | ................... | B60L 11/1803 320/109 |
| 2010/0124087 | A1* | 5/2010 | Falk | ........................ | H02M 1/36 363/131 |
| 2010/0181829 | A1* | 7/2010 | Ichikawa | ............ | B60L 11/1861 307/9.1 |
| 2011/0074302 | A1* | 3/2011 | Draper | ............... | H05B 41/3924 315/224 |
| 2011/0187183 | A1* | 8/2011 | Kimura | .................. | B60L 11/005 307/9.1 |
| 2011/0199801 | A1* | 8/2011 | Grbovic | .................. | H02P 27/06 363/131 |
| 2012/0001480 | A1* | 1/2012 | Favaretto | .................. | B60K 6/48 307/9.1 |
| 2012/0038216 | A1* | 2/2012 | Berry | .................. | B60L 11/005 307/77 |
| 2012/0074774 | A1* | 3/2012 | King | .................. | B60L 11/1803 307/10.1 |
| 2012/0112693 | A1* | 5/2012 | Kusch | .................. | B60L 11/005 320/109 |
| 2012/0153878 | A1* | 6/2012 | King | .................. | B60L 11/1803 318/139 |
| 2012/0229055 | A1* | 9/2012 | Sugiura | .................. | B60L 7/16 318/139 |
| 2012/0257429 | A1* | 10/2012 | Dong | .................. | H02M 3/1582 363/127 |
| 2012/0306468 | A1* | 12/2012 | Butzmann | ............. | H02J 7/0024 323/304 |
| 2012/0319471 | A1* | 12/2012 | Miller | .................. | B60L 3/0046 307/9.1 |
| 2013/0134786 | A1* | 5/2013 | Ishigaki | ................. | H02M 3/158 307/71 |
| 2013/0264975 | A1* | 10/2013 | Kaita | .................. | B60L 11/1853 318/139 |
| 2014/0145694 | A1* | 5/2014 | Ishigaki | .................... | H02J 1/06 323/271 |

FOREIGN PATENT DOCUMENTS

| | | |
|---|---|---|
| JP | 2006345606 A | 12/2006 |
| JP | 2008043180 A | 2/2008 |
| JP | 2010124535 A | 6/2010 |
| JP | 2011182521 A | 9/2011 |
| JP | 2012095428 A | 5/2012 |
| WO | 2012095595 A2 | 7/2012 |

* cited by examiner

POWER SUPPLY DEVICE

TECHNICAL FIELD

The present invention relates to a power supply device for supplying power to a load.

BACKGROUND ART

Conventionally, a power supply device for supplying power to a load by combining a battery and a capacitor has been used. JP2006-345606A discloses a power supply system for a vehicle in which a battery and a capacitor are connected in parallel. In this power supply system, an inverter for an electric motor is driven by electrical energy supplied from the capacitor and the battery.

SUMMARY OF INVENTION

However, in the power supply system of JP2006-345606A, the motor can be no longer driven by the electrical energy from the capacitor if a voltage of the capacitor drops below a voltage capable of driving the inverter. Further, unlike a secondary battery in which a voltage moderately decreases during discharge, the capacitor has a characteristic that a voltage linearly decreases during discharge. Thus, if the voltage of the capacitor drops, the inverter cannot be driven by the supply of electrical energy from the capacitor despite the remaining electrical energy.

The present invention was developed in view of the above problem and aims to effectively utilize electrical energy of a capacitor.

According to one aspect of the present invention, there is provided a power supply device for supplying power to a load by combining a secondary battery and a capacitor includes a bypass switch which enables power to be directly supplied to the load from the capacitor by being switched to a connected state when a voltage of the capacitor is a voltage capable of driving the load, and a first DC-DC converter which enables the voltage of the capacitor to be stepped up and supplied to the load when the voltage of the capacitor drops below a minimum voltage capable of driving the load.

Embodiments and advantages of this invention will be described in detail below with reference to the attached figures.

DESCRIPTION OF EMBODIMENTS

Hereinafter, embodiments of the present invention are described with reference to the drawings.

(First Embodiment)

A power supply device 100 according to a first embodiment of the present invention is described below with reference to FIGS. 1 to 4.

Figure 1:
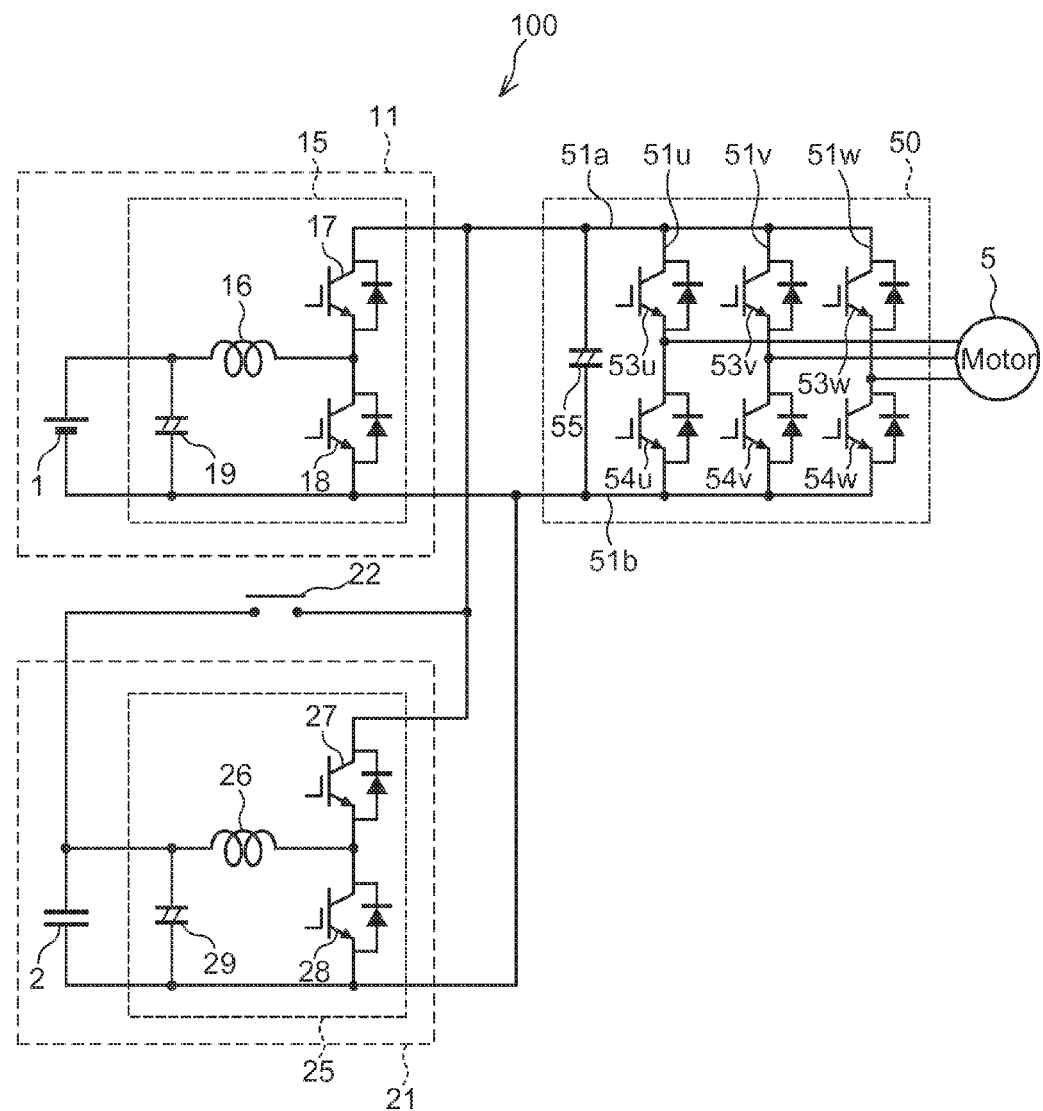
FIG. 1 is an electrical circuit diagram of a power supply device according to a first embodiment of the present invention.
Figure 2:
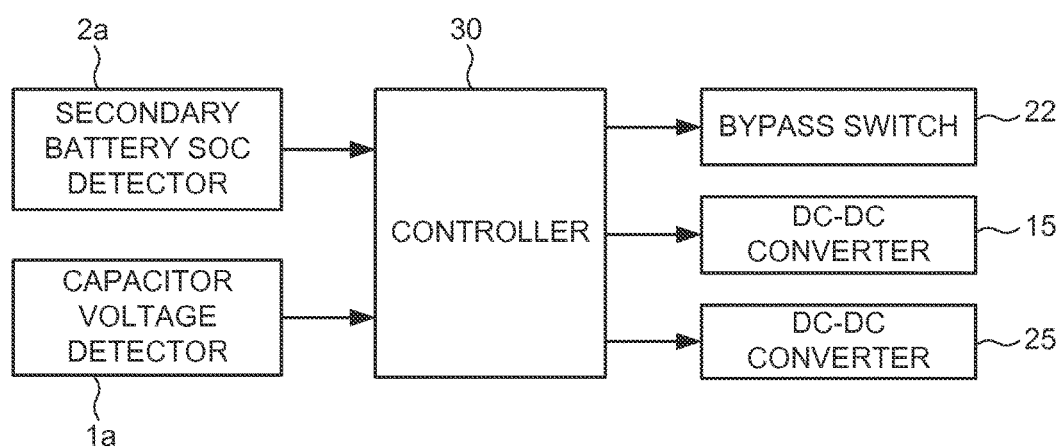
FIG. 2 is a block diagram of the power supply device according to the first embodiment of the present invention.

First, the configuration of the power supply device 100 is described with reference to FIGS. 1 and 2.

The power supply device 100 supplies power to a load by combining a secondary battery 1 and a capacitor 2. This load is an inverter 50 for driving an electric motor 5 by the supply of power from the secondary battery 1 and the capacitor 2. The power supply device 100 is applied to an HEV (Hybrid Electric Vehicle), an EV (Electric Vehicle), and the like.

First, the inverter 50 to which power is supplied from the power supply device 100 and the electric motor 5 to be driven by the inverter 50 are described.

The electric motor 5 is a drive motor mounted in an HEV or an EV. The electric motor 5 is a three-phase induction motor generator which is driven by a rotating electric field generated by a three-phase alternating current. The electric motor 5 is provided with a stator including a plurality of coils (not shown) constituting each of a U-phase, a V-phase and a W-phase on an inner periphery, and a rotator including a permanent magnet and configured to rotate on the inner periphery of the stator. The electric motor 5 is such that the stator is fixed to a vehicle body (not shown) and a rotary shaft of the rotator is coupled to an axle (not shown) of wheels. The electric motor 5 can convert electrical energy into the rotation of wheels and can convert the rotation of the wheels into electrical energy.

The inverter 50 is a current converter for generating alternating current power from direct current power supplied from the secondary battery 1 and the capacitor 2. The inverter 50 has a rated voltage of 600 V and a drivable minimum voltage of 350 V. This minimum voltage corresponds to a minimum voltage capable of driving the load.

The inverter 50 converts the direct current power supplied from the secondary battery 1 and the capacitor 2 into a three-phase alternating current composed of a U-phase, a V-phase and a W-phase shifted at an interval of 120° and supplies it to the electric motor 5.

The inverter 50 includes a positive-side power line 51a, a negative-side power line 51b, a U-phase power line 51u, a V-phase power line 51v and a W-phase power line 51w. The positive-side power line 51a is connected to positive electrodes of the secondary battery 1 and the capacitor 2. The negative-side power line 51b is connected to negative electrodes of the secondary battery 1 and the capacitor 2. The U-phase power line 51u, the V-phase power line 51v and the W-phase power line 51w are provided between the positive-side power line 51a and the negative-side power line 51b. Further, a smoothing condenser 55 for smoothing the direct current power transferred between the secondary battery 1, the capacitor 2 and the inverter 50 is connected in parallel between the positive-side power line 51a and the negative-side power line 51b.

The inverter 50 includes IGBTs (Insulated Gate Bipolar Transistors) 53u, 54u, 53v, 54v, 53w and 54w as six switching elements. These IGBTs 53u to 54w are each an IGBT with a rectifying diode connected in parallel in an opposite direction.

The IGBT 53u and the IGBT 54u are provided in series in the U-phase power line 51u. The U-phase power line 51u between the IGBT 53u and the IGBT 54u is connected to the coil constituting the U-phase of the electric motor 5. The IGBT 53v and the IGBT 54v are provided in series in the V-phase power line 51v. The V-phase power line 51v between the IGBT 53v and the IGBT 54v is connected to the coil constituting the V-phase of the electric motor 5. The IGBT 53w and the IGBT 54w are provided in series in the W-phase power line 51w. The W-phase power line 51w between the IGBT 53w and the IGBT 54w is connected to the coil constituting the W-phase of the electric motor 5.

The inverter 50 generates an alternating current to drive the electric motor 5 by the IGBTs 53u, 54u, 53v, 54v, 53w and 54w being controlled by a motor controller (not shown).

Next, the configuration of the power supply device 100 is described.

The power supply device 100 is provided with a secondary battery power supply unit 11 including the secondary battery 1, a capacitor power supply unit 21 including the capacitor 2 and a controller 30 (see FIG. 2) for controlling the supply of power to the inverter 50 from the secondary battery 1 and the capacitor 2. The secondary battery power supply unit 11 and the capacitor power supply unit 21 are connected in parallel. That is, the secondary battery 1 and the capacitor 2 are connected in parallel.

The secondary battery 1 is a chemical battery such as a lithium ion secondary battery or a nickel hydrogen secondary battery. Here, a voltage of the secondary battery 1 is set at 300 V. The secondary battery 1 includes a secondary battery SOC detector 1a (see FIG. 2) for detecting a SOC (State of Charge) and transmitting a corresponding signal to the controller 30.

The capacitor 2 is an electric double-layer capacitor in which a plurality of capacitors are connected in series and set at a desired voltage and a plurality of capacitors are connected in parallel and set at a desired storage capacity. Here, a voltage of the capacitor 2 is set at 600 V. The capacitor 2 includes a capacitor voltage detector 2a (see FIG. 2) for detecting a voltage and transmitting a corresponding signal to the controller 30.

The capacitor power supply unit 21 includes a bypass switch 22 which is switched to a connected state when the voltage of the capacitor 2 is a voltage capable of driving the electric motor 5 and a DC-DC converter 25 (first DC-DC converter) which enables the voltage of the capacitor 2 to be stepped up and supplied to the inverter 50 when the voltage of the capacitor 2 drops below a minimum voltage capable of driving the inverter 50.

The bypass switch 22 is controlled to be opened and closed by the controller 30. The bypass switch 22 enables power to be directly supplied to the inverter 50 from the capacitor 2 when being switched to the connected state. When the bypass switch 22 is switched to a shut-off state, power cannot be directly supplied from the capacitor 2 to the inverter 50. In this case, power is supplied from the capacitor 2 to the inverter 50 via the DC-DC converter 25.

Further, the bypass switch 22 enables power generated by the electric motor 5 to be directly charged into the capacitor 2 without passing through the DC-DC converter 25 when being switched to the connected state. In this way, an energy loss at the time of charging the capacitor 2 can be reduced.

The DC-DC converter 25 enables the voltage of the capacitor 2 to be stepped up and supplied to the electric motor 5 and enables the power generated by the electric motor 5 to be stepped down and charged into the capacitor 2.

The DC-DC converter 25 includes a reactor 26 provided downstream of the capacitor 2, a step-down control transistor 27 provided between the reactor 26 and an upstream side of the electric motor 5, a step-up control transistor 28 provided between the reactor 26 and a downstream side of the electric motor 5 and a smoothing condenser 29 connected in parallel to the capacitor 2.

The reactor 26 accumulates energy when the step-up control transistor 28 is on. When the step-up control transistor 28 is turned off, an induced electromotive force by the voltage input from the capacitor 2 and the energy accumulated in the reactor 26 is output. In this way, the reactor 26 can step up and output the input voltage by the switching of the step-up control transistor 28.

The step-up control transistor 28 is switched by the controller 30. The step-up control transistor 28 is an IGBT with a rectifying diode connected in parallel in an opposite direction. The step-up control transistor 28 can step up a supply voltage to be supplied to the electric motor 5 by the induced electromotive force by switching a current of the reactor 26.

When the step-up control transistor 28 is switched on, a current from the positive electrode of the capacitor 2 flows to the negative electrode of the capacitor 2 by way of the reactor 26 and the step-up control transistor 28. By this current loop, energy is accumulated in the reactor 26.

The step-down control transistor 27 is switched by the controller 30. The step-down control transistor 27 is an IGBT with a rectifying diode connected in parallel in an opposite direction. The step-down control transistor 27 can step down a charge voltage from the electric motor 5 by switching. The step-down control transistor 27 steps down the power generated by the electric motor 5 by a chopper control and charges it into the capacitor 2.

The smoothing condenser 29 smoothes the voltage output by the chopper control of the step-down control transistor 27. In this way, the power generated by the electric motor 5 can be stabilized by smoothing the voltage at the time of charging the capacitor 2.

The secondary battery power supply unit 11 includes a DC-DC converter 15 (second DC-DC converter) which enables the voltage of the secondary battery 1 to be stepped up and supplied to the electric motor 5 when the inverter 50 can be no longer driven by the power from the capacitor 2.

The DC-DC converter 15 enables the voltage of the secondary battery 1 to be stepped up and supplied to the electric motor 5 and enables the power generated by the electric motor 5 to be stepped down and charged into the secondary battery 1.

The DC-DC converter 15 includes a reactor 16 provided downstream of the secondary battery 1, a step-down control transistor 17 provided between the reactor 16 and the upstream side of the electric motor 5 that is capable of stepping down a charge voltage from the electric motor 5 by switching, and a step-up control transistor 18 provided between the reactor 16 and the downstream side of the electric motor 5 that is capable of stepping up a supply voltage to be supplied to the electric motor 5 by the induced electromotive force by switching a current of the reactor 16. These components are not described in detail here as they are similar to those of the DC-DC converter 25.

The controller 30 (see FIG. 2) controls the power supply device 100. The controller 30 is a microcomputer with a CPU (Central Processing Unit), ROM (Read-Only Memory), RAM (Random Access Memory) and an I/O interface (Input/Output interface). The RAM stores data in the processing of the CPU. The ROM stores a control program of the CPU and the like in advance. The I/O interface is used to input and output information to and from a connected device. By operating the CPU, RAM and the like in accordance with the program stored in the ROM, the control of the power supply device 100 is realized.

Next, the control of the power supply device 100 by the controller 30 is described with reference to FIGS. 3 and 4.

Figure 3:
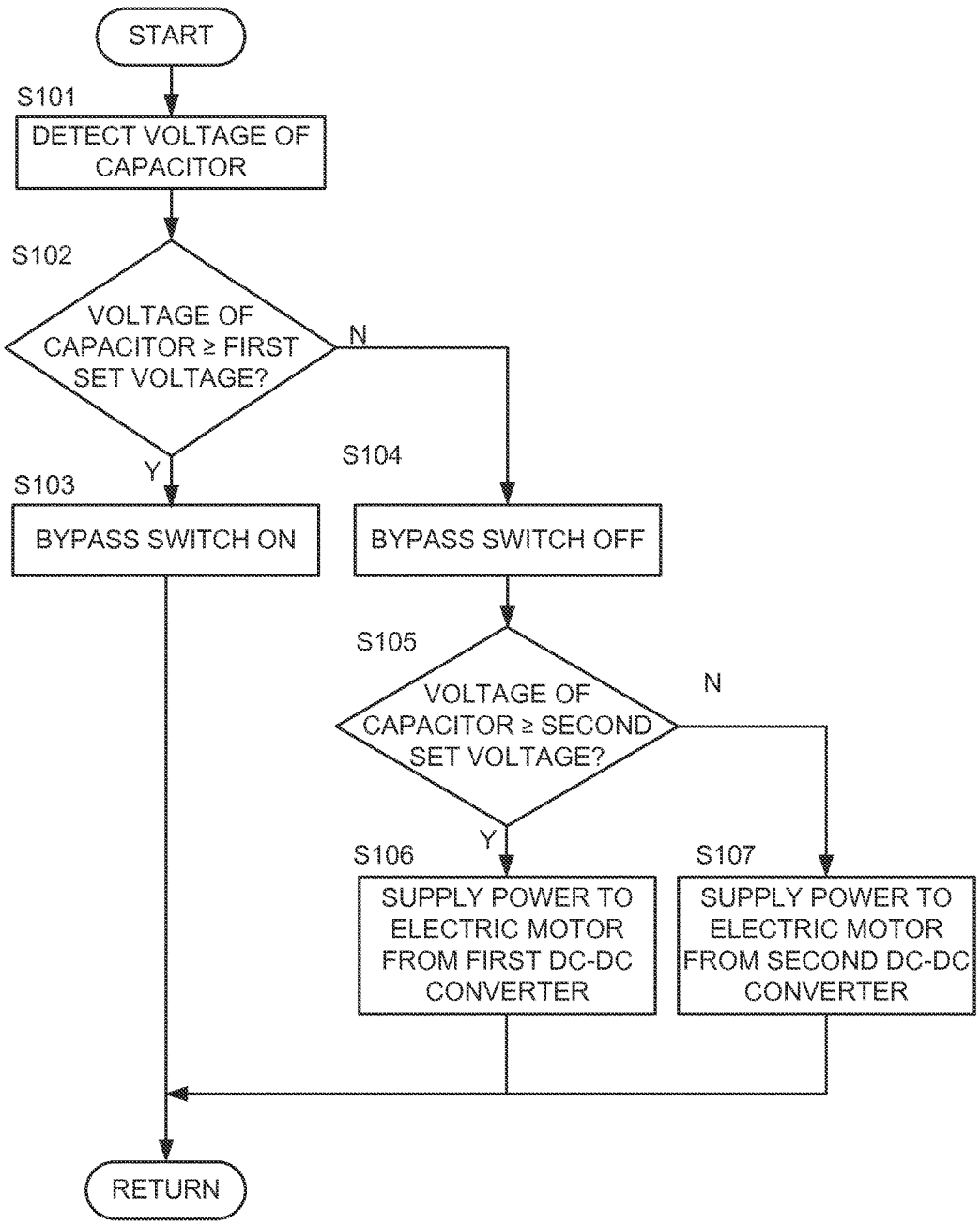
FIG. 3 is a flow chart showing a power supply control from the power supply device to a load.

The controller 30 repeatedly executes a routine shown in FIG. 3 at a fixed time interval of, e.g. 10 milliseconds. In FIG. 4, horizontal axes represent time and vertical axes successively represent a drive force of the electric motor 5, an output voltage of the capacitor 2, an output voltage of the secondary battery 1 and an input voltage of the inverter 50 from above.

In Step S101, the controller 30 reads a voltage of the capacitor 2 detected by the capacitor voltage detector 2a.

In Step S102, the controller 30 determines whether or not the voltage of the capacitor 2 is the same or higher than a first set voltage. If the voltage of the capacitor 2 is determined to be not lower than the first set voltage in Step S102, a return is made after a transition is made to Step S103. On the other hand, a transition is made to Step S104 if the voltage of the capacitor is determined to be lower than the first set voltage.

This first set voltage is set at a value higher than the minimum voltage capable of driving the inverter 50 by a margin voltage. Since the minimum voltage capable of driving the inverter 50 is 350 V here, the first set voltage is set at a value slightly higher than 350 V.

In Step S103, the controller 30 sets the bypass switch 22 to the connected state. In this way, power is directly supplied from the capacitor 2 to the inverter 50 and the electric motor 5 is driven.

Figure 4:
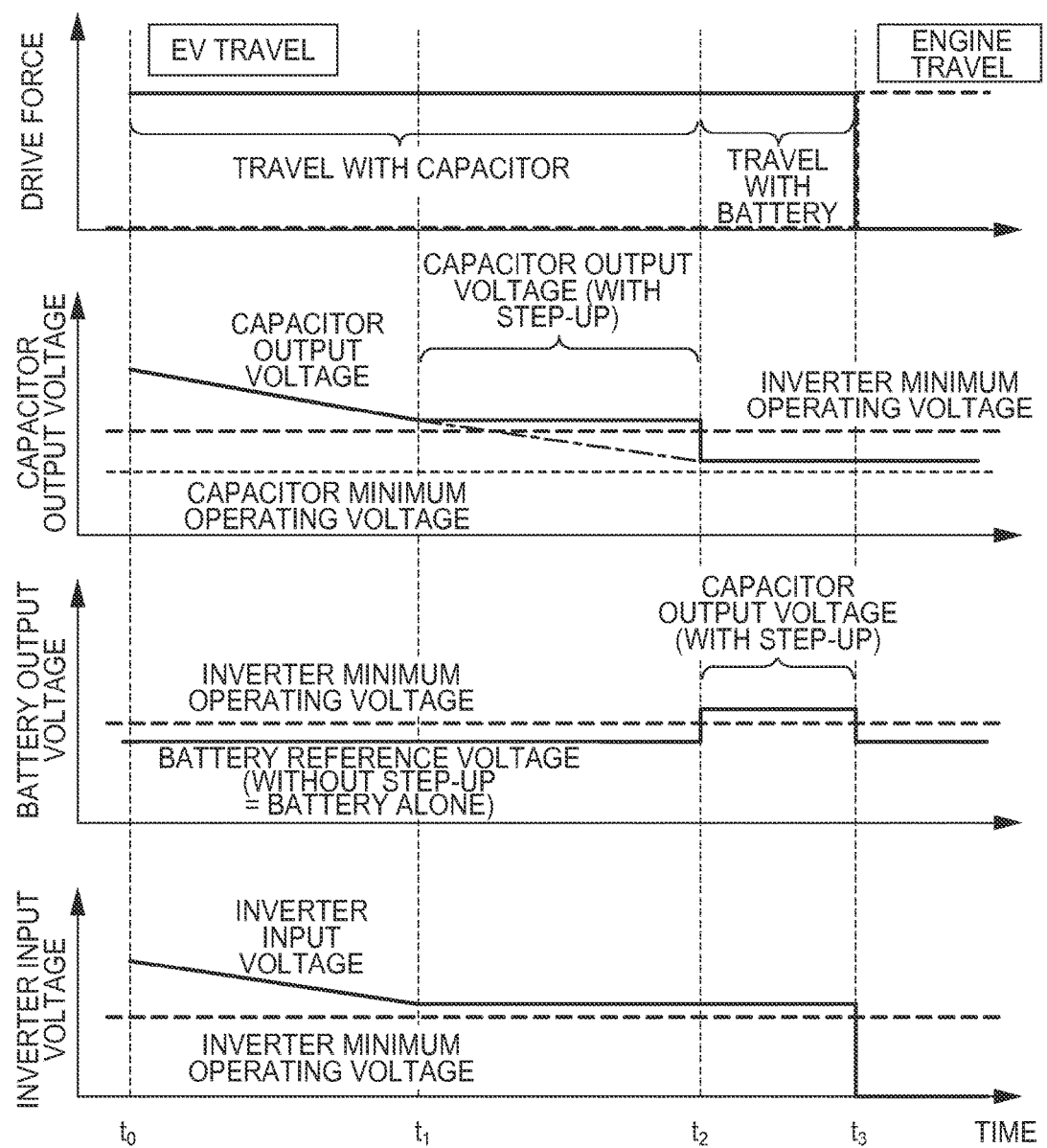
FIG. 4 is a chart explaining functions of the power supply device.

This state corresponds to a period between $t_0$ and $t_1$ in FIG. 4. Specifically, EV travel by the electric motor 5 is started from to and the voltage of the capacitor 2 proportionally decreases by as much as the consumed electrical energy. This EV travel is continued until the voltage of the capacitor 2 approaches the minimum voltage capable of driving the inverter 50 and drops below the aforementioned first set voltage.

Since power is directly supplied from the capacitor 2 to the inverter 50 at this time, an energy loss is small. Thus, a large current can be instantaneously supplied to the inverter 50, taking advantage of a characteristic of the capacitor 2.

In Step S104, the controller 30 sets the bypass switch 22 to the shut-off state. In this way, power is no longer directly supplied from the capacitor 2 to the inverter 50. At this time, the electrical energy remains in the capacitor 2. If a decrease of the electrical energy is considered to be proportional to a voltage drop, about 34% of the electrical energy remains in the capacitor 2, whose voltage was dropped from 600 V to 350 V, if the electrical energy at full charge is assumed to be 100%.

Conventionally, if the voltage of the capacitor 2 drops below the minimum voltage capable of driving the inverter 50, the inverter 50 is no longer driven by the capacitor 2 regardless if the electrical energy remains in the capacitor 2. Accordingly, in the power supply device 100, the electrical energy remaining in the capacitor 2 is utilized in the following manner.

In Step S105, the controller 30 determines whether or not the voltage of the capacitor 2 is the same or higher than a second set voltage. If the voltage of the capacitor 2 is determined to be not lower than the second set voltage in Step S105, a return is made after a transition is made to Step S106. On the other hand, a return is made after a transition is made to Step S107 if the voltage of the capacitor is determined to be lower than the second set voltage.

This second set voltage is set at a value higher than a minimum operating voltage, which is a minimum voltage at which the capacitor 2 is operable, by a margin voltage. Further, the second set voltage is set at a value lower than the aforementioned first set voltage.

In Step S106, the controller 30 supplies the power from the capacitor 2 stepped up by the DC-DC converter 25 to the inverter 50. In this way, the DC-DC converter 25 steps up the voltage of the capacitor 2 and supplies it to the inverter 50 even if the voltage of the capacitor 2 drops below the minimum voltage capable of driving the inverter 50.

This state corresponds to a period between $t_1$ and $t_2$ in FIG. 4. Specifically, the EV travel started from to is continued up to $t_2$ beyond $t_1$ since the voltage of the capacitor 2 is stepped up by the DC-DC converter 25 and supplied to the inverter 50. Also at this time, an actual voltage of the capacitor 2 proportionally decreases by as much as the consumed electrical energy, as shown by a dashed-dotted line. This EV travel is continued until the actual voltage of the capacitor 2 approaches the minimum operating voltage and drops below the aforementioned second set voltage.

As described above, the inverter 50 can be driven using the electrical energy remaining in the capacitor 2 even if the voltage of the capacitor 2 drops below the minimum voltage capable of driving the inverter 50. Thus, the electrical energy of the capacitor 2 can be effectively utilized.

Further, since the electrical energy of the capacitor 2 can be effectively utilized, the capacity of the capacitor 2 necessary to output the same electrical energy to the inverter 50 can be reduced. Thus, the capacitor 2 can be reduced in size and weight. Further, since an EV travelable distance becomes longer than before when the power supply device 100 is applied to an HEV, the amount of fuel consumption by an engine can be reduced.

On the other hand, in Step S107, the controller 30 supplies the power from the secondary battery 1 stepped up by the DC-DC converter 15 to the inverter 50. Since the electrical energy in the capacitor 2 is already reduced to an unusable level in Step S107, the inverter 50 is driven using the secondary battery 1. Specifically, the inverter 50 is driven by stepping up the voltage of the secondary battery 1 from 300 V to the aforementioned first set voltage.

That is, if the voltage of the capacitor 2 becomes lower than the second set voltage, the supply of power to the inverter 50 from the DC-DC converter 25 is stopped and the supply of power to the inverter 50 from the DC-DC converter 15 is started.

This state corresponds to a period between $t_2$ and $t_3$ in FIG. 4. Specifically, the EV travel started from to is continued up to $t_3$ beyond $t_2$ since the voltage of the secondary battery 1 is stepped up by the DC-DC converter 15 and supplied to the inverter 50.

This EV travel can be continued until the SOC of the secondary battery 1 detected by the secondary battery SOC detector 1a drops below a set value. It should be noted that, in the case of an HEV, even if the SOC of the secondary battery 1 detected by the secondary battery SOC detector 1a drops below the set value, an engine (not shown) of the vehicle operates and the vehicle can travel using a drive force from the engine.

According to the above embodiment, the following effects are exhibited.

In the power supply device 100, the voltage of the capacitor 2 can be stepped up by the DC-DC converter 25 and supplied to the inverter 50 even if the voltage of the capacitor 2 drops below the minimum voltage capable of driving the inverter 50. Thus, the inverter 50 can be driven using the electrical energy remaining in the capacitor 2 even if the voltage of the capacitor 2 drops below the minimum voltage capable of driving the inverter 50. Therefore, the electrical energy of the capacitor 2 can be effectively utilized.

Further, since the electrical energy of the capacitor 2 can be effectively utilized, the capacity of the capacitor 2 necessary to output the same electrical energy to the inverter 50 can be reduced. Thus, the capacitor 2 can be reduced in size and weight. Further, in the case of applying the power supply device 100 to an HEV, the EV travelable distance becomes longer than before, wherefore the amount of fuel consumption by an engine can be reduced.

It should be noted that the electrical energy generated by the electric motor 5 is first charged into the capacitor 2 at the time of braking the vehicle. At this time, if the voltage of the capacitor 2 is lower than the minimum voltage capable of driving the inverter 50, the controller 30 sets the bypass switch 22 to the connected state. This enables the capacitor 2 to be charged with an induced voltage of the electric motor 5.

If the voltage of the capacitor 2 becomes the same or higher than the minimum voltage capable of driving the inverter 50, the controller 30 causes the DC-DC converter 25 to operate, step down the electrical energy generated by the electric motor 5 and charge it into the capacitor 2. In this way, an adjustment to a voltage and a current suitable for the charging of the capacitor 2 can be made, wherefore the capacitor 2 can be efficiently charged.

When the capacitor 2 is fully charged, the controller 30 causes the DC-DC converter 15 to operate, step down the electrical energy generated by the electric motor 5 and charge it into the secondary battery 1. Also in this case, an adjustment to a voltage and a current suitable for the charging of the secondary battery 1 can be made, wherefore the secondary battery 1 can be efficiently charged.

(Second Embodiment)

Figure 5:
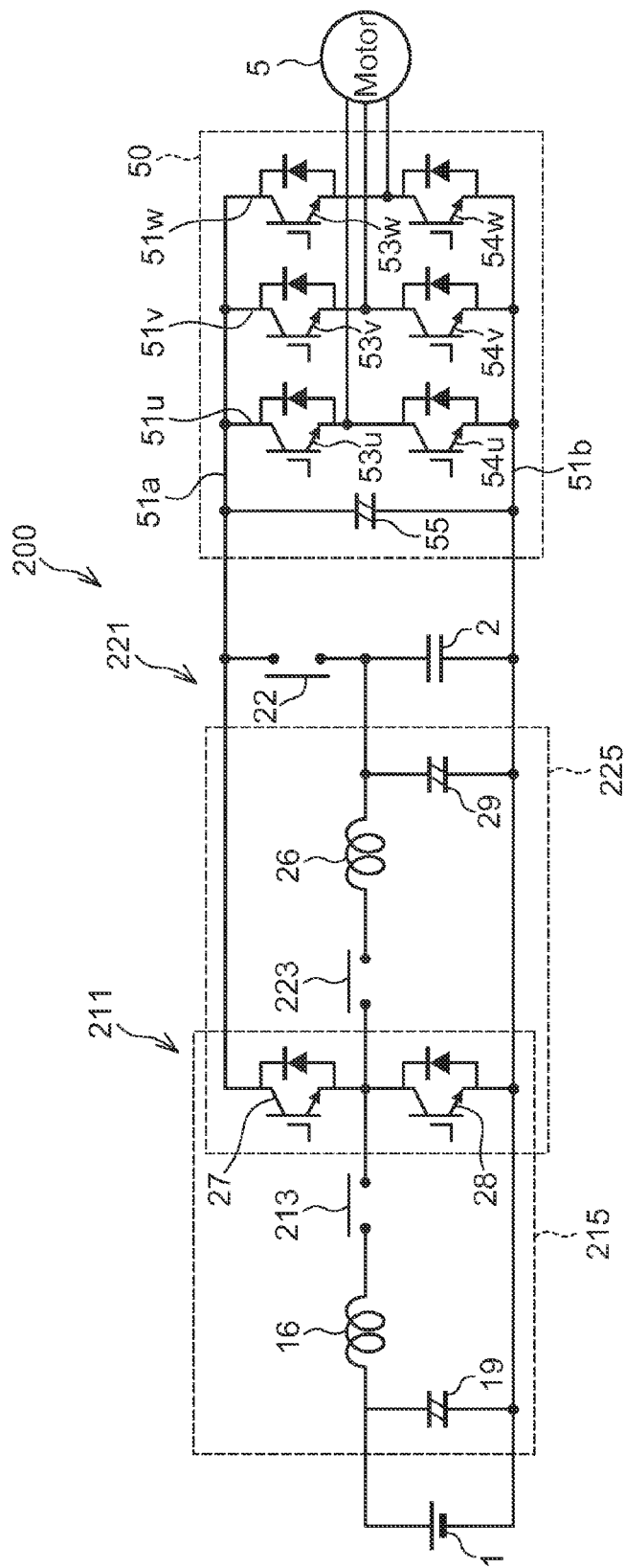
FIG. 5 is an electrical circuit diagram of a power supply device according to a second embodiment of the present invention.

A power supply device 200 according to a second embodiment of the present invention is described below with reference to FIG. 5. It should be noted that, in each of the following embodiments, components similar to those of the aforementioned embodiment are denoted by the same reference signs and repeated description is omitted as appropriate.

The power supply device 200 supplies power to an inverter 50 for driving an electric motor 5 by combining a secondary battery 1 and a capacitor 2.

The power supply device 200 is provided with a secondary battery power supply unit 211 including a secondary battery 1, a capacitor power supply unit 221 including the capacitor 2 and a controller 30 (see FIG. 2) for controlling the supply of power to the inverter 50 from the secondary battery 1 and the capacitor 2.

The capacitor power supply unit 221 includes a bypass switch 22 which is switched to a connected state when a voltage of the capacitor 2 is a voltage capable of driving the electric motor 5 and a DC-DC converter 225 (first DC-DC converter) which enables the voltage of the capacitor 2 to be stepped up and supplied to the inverter 50 when the voltage of the capacitor 2 drops below a minimum voltage capable of driving the inverter 50.

The DC-DC converter 225 enables the voltage of the capacitor 2 to be stepped up and supplied to the electric motor 5 and enables the power generated by the electric motor 5 to be stepped down and charged into the capacitor 2.

The DC-DC converter 225 includes a reactor 26 (first reactor) provided downstream of the capacitor 2, a step-down control transistor 27 provided between the reactor 26 and an upstream side of the electric motor 5, a step-up control transistor 28 provided between the reactor 26 and a downstream side of the electric motor 5, and a smoothing condenser 29 connected in parallel to the capacitor 2.

A DC-DC converter 215 enables a voltage of the secondary battery 1 to be stepped up and supplied to the electric motor 5 and enables the power generated by the electric motor 5 to be stepped down and charged into the secondary battery 1.

The DC-DC converter 215 includes a reactor 16 (second reactor) provided downstream of the secondary battery 1, the step-down control transistor 27 provided between the reactor 16 and the upstream side of the electric motor 5 that is capable of stepping down a charge voltage from the electric motor 5 by switching, and the step-up control transistor 28 provided between the reactor 16 and the downstream side of the electric motor 5 that is capable of stepping up a supply voltage to be supplied to the electric motor 5 by an induced electromotive force by switching a current of the reactor 16.

As just described, the DC-DC converter 215 includes the reactor 16 provided downstream of the secondary battery 1 and shares the step-down control transistor 27 and the step-up control transistor 28 with the DC-DC converter 225.

Specifically, the DC-DC converter 215 includes a change-over switch 213 and the DC-DC converter 225 includes a changeover switch 223. The changeover switch 213 is provided in wiring coupling between a downstream side of the reactor 16 and the step-down control transistor 27 and the step-up control transistor 28. On the other hand, the changeover switch 223 is provided in wiring coupling between the downstream side of the reactor 26 and the step-down control transistor 27 and the step-up control transistor 28.

When the changeover switch 213 is set to a connected state and the changeover switch 223 is set to a shut-off state, the step-down control transistor 27 and the step-up control transistor 28 constitute the DC-DC converter 215. On the other hand, when the changeover switch 213 is set to the shut-off state and the changeover switch 223 is set to the connected state, the step-down control transistor 27 and the step-up control transistor 28 constitute the DC-DC converter 225.

As described above, also in the power supply device 200, the DC-DC converter 225 steps up the voltage of the capacitor 2 and supplies it to the inverter 50 even if the voltage of the capacitor 2 drops below the minimum voltage capable of driving the inverter 50. Thus, the inverter 50 can be driven using the electrical energy remaining in the capacitor 2 even if the voltage of the capacitor 2 drops below the minimum voltage capable of driving the inverter 50. Therefore, the electrical energy of the capacitor 2 can be effectively utilized.

Further, by sharing the step-down control transistor 27 and the step-up control transistor 28 by the DC-DC converter 215 and the DC-DC converter 225, the number of parts can be reduced and cost can be reduced.

(Third Embodiment)

Figure 6:
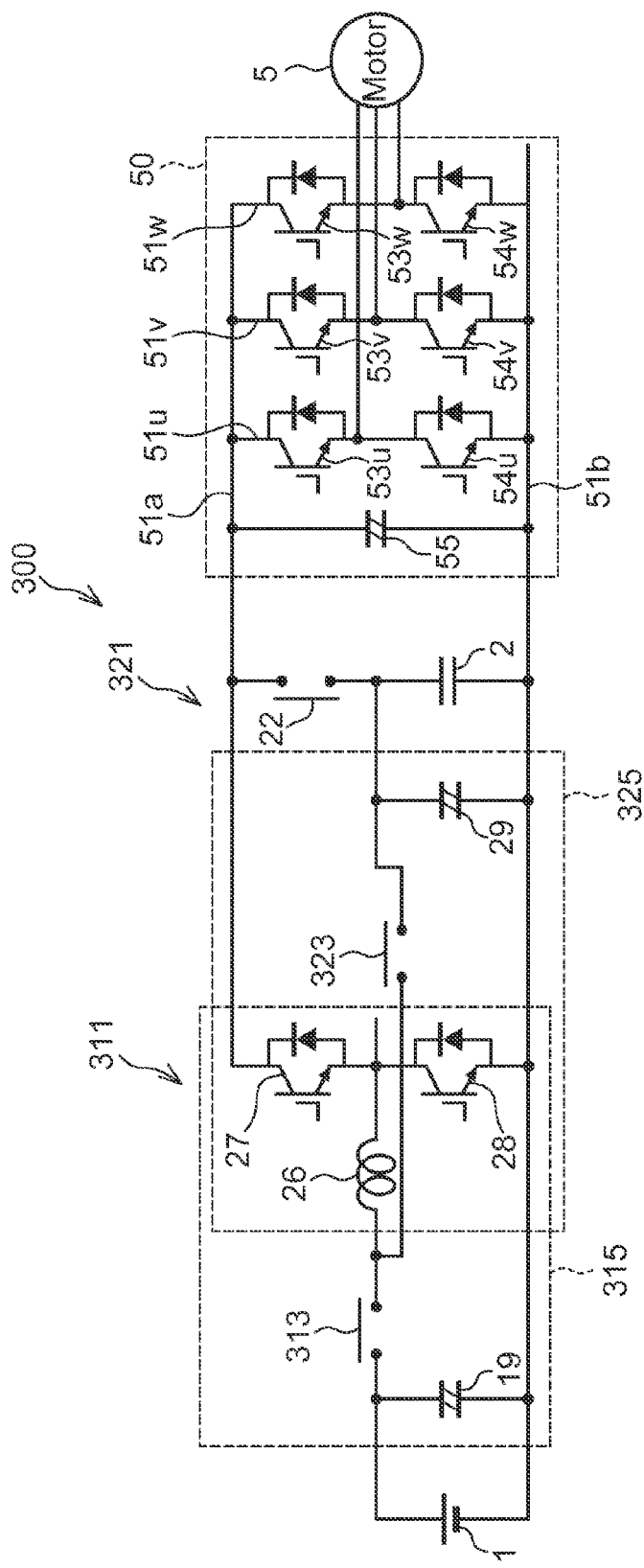
FIG. 6 is an electrical circuit diagram of a power supply device according to a third embodiment of the present invention.

A power supply device 300 according to a third embodiment of the present invention is described below with reference to FIG. 6.

The power supply device 300 supplies power to an inverter 50 for driving an electric motor 5 by combining a secondary battery 1 and a capacitor 2.

The power supply device 300 is provided with a secondary battery power supply unit 311 including the secondary battery 1, a capacitor power supply unit 321 including the capacitor 2 and a controller 30 (see FIG. 2) for controlling the supply of power to the inverter 50 from the secondary battery 1 and the capacitor 2.

The capacitor power supply unit 321 includes a bypass switch 22 which is switched to a connected state when a voltage of the capacitor 2 is a voltage capable of driving the electric motor 5, and a DC-DC converter 325 (first DC-DC converter) which enables the voltage of the capacitor 2 to be stepped up and supplied to the inverter 50 when the voltage of the capacitor 2 drops below a minimum voltage capable of driving the inverter 50.

The DC-DC converter 325 enables the voltage of the capacitor 2 to be stepped up and supplied to the electric motor 5 and enables the power generated by the electric motor 5 to be stepped down and charged into the capacitor 2.

The DC-DC converter 325 includes a reactor 26 provided downstream of the capacitor 2, a step-down control transistor 27 provided between the reactor 26 and an upstream side of the electric motor 5, a step-up control transistor 28 provided between the reactor 26 and a downstream side of the electric motor 5 and a smoothing condenser 29 connected in parallel to the capacitor 2.

A DC-DC converter 315 enables the voltage of the secondary battery 1 to be stepped up and supplied to the electric motor 5 and enables the power generated by the electric motor 5 to be stepped down and charged into the secondary battery 1.

The DC-DC converter 315 includes the reactor 26 provided downstream of the secondary battery 1, the step-down control transistor 27 provided between the reactor 26 and the upstream side of the electric motor 5 that is capable of stepping down a charge voltage from the electric motor 5 by switching, and the step-up control transistor 28 provided between the reactor 26 and the downstream side of the electric motor 5 that is capable of stepping up a supply voltage to be supplied to the electric motor 5 by an induced electromotive force by switching a current of the reactor 26.

Therefore, the DC-DC converter 315 shares the reactor 26, the step-down control transistor 27 and the step-up control transistor 28 with the DC-DC converter 325.

Specifically, the DC-DC converter 315 includes a changeover switch 313 and the DC-DC converter 325 includes a changeover switch 323. The changeover switch 313 is provided in wiring coupling between an upstream side of the reactor 26 and the step-down control transistor 27 and the step-up control transistor 28. On the other hand, the changeover switch 323 is provided in wiring coupling between the upstream side of the reactor 26 and the step-down control transistor 27 and the step-up control transistor 28.

When the changeover switch 313 is set to a connected state and the changeover switch 323 is set to a shut-off state, the reactor 26, the step-down control transistor 27 and the step-up control transistor 28 constitute the DC-DC converter 315. On the other hand, when the changeover switch 313 is set to the shut-off state and the changeover switch 323 is set to the connected state, the reactor 26, the step-down control transistor 27 and the step-up control transistor 28 constitute the DC-DC converter 325.

As described above, also in the power supply device 300, the DC-DC converter 225 steps up the voltage of the capacitor 2 and supplies it to the inverter 50 even if the voltage of the capacitor 2 drops below the minimum voltage capable of driving the inverter 50. Thus, the inverter 50 can be driven using the electrical energy remaining in the capacitor 2 even if the voltage of the capacitor 2 drops below the minimum voltage capable of driving the inverter 50. Therefore, the electrical energy of the capacitor 2 can be effectively utilized.

Further, by sharing the reactor 26, the step-down control transistor 27 and the step-up control transistor 28 by the DC-DC converter 315 and the DC-DC converter 325, the number of parts can be reduced and cost can be further reduced.

Embodiments of the this invention were described above, but above embodiments are merely examples of the applications of this invention, and the technical scope of the this invention is not limited to the specific constitutions of the above embodiments.

For example, numerical values such as those of the voltages in the aforementioned embodiments are illustrative and there is no limitation to these numerical values.

Further, in the aforementioned embodiments, the power supply device 100, 200, 300 is controlled by the controller 30 and the inverter 50 is controlled by a motor controller (not shown). Instead of this, the power supply device 100, 200, 300 and the inverter 50 may be controlled by a single controller.

Further, each of the aforementioned IGBTs is an IGBT with a rectifying diode connected in parallel in an opposite direction. Instead of this, an IGBT incorporating no diode and a rectifying diode connected in parallel to the IGBT in an opposite direction may be separately provided.

The embodiments of this invention in which an exclusive property or privilege is claimed are defined as follows:

1. A power supply device for supplying power to a load by combining a rechargeable battery and a capacitor, comprising:
   a first DC-DC converter connected between the capacitor and the load and configured to enable a voltage of the capacitor to be stepped up and supplied to the load;
   a bypass switch enabling power to be directly supplied to the load from the capacitor by bypassing the first DC-DC converter when switched to a connected state; and
   a controller configured to control the first DC-DC converter and a connecting state of the bypass switch;
   wherein the rechargeable battery is connected to the load without going through the first DC-DC converter; and
   wherein the controller is configured to:
      switch the bypass switch to the connected state to directly supply power to the load from the capacitor when a voltage of the capacitor is a voltage capable of driving the load,
      control the first DC-DC converter to step up the voltage of the capacitor to supply power to the load when the voltage of the capacitor drops below a minimum voltage capable of driving the load, and
      switch the bypass switch to the connected state to directly supply a regenerative power to the rechargeable battery from the load when the voltage of the capacitor drops below the minimum voltage capable of driving the load.

2. The power supply device according to claim 1, further comprising:
   a second DC-DC converter adapted to enable a voltage of the rechargeable battery to be stepped up and supplied to the load when the load is no longer drivable by power from the capacitor.

3. The power supply device according to claim 2, wherein:
   the bypass switch is switched to a shut-off state when the voltage of the capacitor becomes lower than a voltage higher than the minimum voltage capable of driving the load by a margin voltage; and the first DC-DC converter steps up the voltage of the capacitor and supplies the stepped-up voltage to the load when the bypass switch is switched to the shut-off state.

4. The power supply device according to claim 3, wherein:
the supply of power to the load from the first DC-DC converter is stopped and the supply of power to the load from the second DC-DC converter is started when the voltage of the capacitor becomes lower than a voltage higher than a minimum operating voltage of the capacitor by a margin voltage.

5. The power supply device according to claim 2, wherein:
the load is an inverter for driving an electric motor by the supply of power from the rechargeable battery and the capacitor.

6. The power supply device according to claim 5, wherein:
the first DC-DC converter is capable of stepping down power generated by the electric motor and charging the stepped-down power into the capacitor; and
the second DC-DC converter is capable of stepping down the power generated by the electric motor and charging the stepped-down power into the rechargeable battery.

7. The power supply device according to claim 5, wherein:
the bypass switch, when switched to the connected state, enables power generated by the electric motor to be directly charged into the capacitor without passing through the first DC-DC converter.

8. The power supply device according to claim 5, wherein:
each of the first and second DC-DC converters includes:
a reactor provided downstream of the rechargeable battery or the capacitor;
a step-down control transistor provided between the reactor and an upstream side of the electric motor that is capable of stepping down a charge voltage from the electric motor by switching; and
a step-up control transistor provided between the reactor and a downstream side of the electric motor that is capable of stepping up a supply voltage to be supplied to the electric motor by an induced electromotive force by switching a current of the reactor.

9. The power supply device according to claim 5, wherein:
the first DC-DC converter includes:
a first reactor provided downstream of the capacitor;
a step-down control transistor provided between the first reactor and an upstream side of the electric motor that is capable of stepping down a charge voltage from the electric motor by switching; and
a step-up control transistor provided between the first reactor and a downstream side of the electric motor that is capable of stepping up a supply voltage to be supplied to the electric motor by an induced electromotive force by switching a current of the first reactor; and
the second DC-DC converter includes a second reactor provided downstream of the rechargeable battery and that shares the step-down control transistor and the step-up control transistor with the first DC-DC converter.

10. The power supply device according to claim 5, wherein:
the first DC-DC converter includes:
a reactor provided downstream of the capacitor;
a step-down control transistor provided between the reactor and an upstream side of the electric motor that is capable of stepping down a charge voltage from the electric motor by switching; and
a step-up control transistor provided between the reactor and a downstream side of the electric motor that is capable of stepping up a supply voltage to be supplied to the electric motor by an induced electromotive force by switching a current of the reactor; and
the second DC-DC converter shares the reactor, the step-down control transistor and the step-up control transistor with the first DC-DC converter.

* * * * *